United States Patent
Raffiee et al.

(10) Patent No.: US 12,493,998 B2
(45) Date of Patent: Dec. 9, 2025

(54) SYSTEMS AND METHODS OF IDENTITY REMOVAL IN IMAGES

(71) Applicant: Salesforce, Inc., San Francisco, CA (US)

(72) Inventors: Amir Hossein Raffiee, Cambridge, MA (US); Keld Lundgaard, Cambridge, MA (US); Zhichao Wang, Cambridge, MA (US)

(73) Assignee: Salesforce, Inc., San Francisco, CA (US)

( * ) Notice: Subject to any disclaimer, the term of this patent is extended or adjusted under 35 U.S.C. 154(b) by 380 days.

(21) Appl. No.: 18/102,121

(22) Filed: Jan. 27, 2023

(65) Prior Publication Data

US 2024/0257407 A1 Aug. 1, 2024

(51) Int. Cl.
*G06T 11/00* (2006.01)
*G06N 20/00* (2019.01)
*G06V 40/16* (2022.01)

(52) U.S. Cl.
CPC .............. *G06T 11/00* (2013.01); *G06N 20/00* (2019.01); *G06V 40/168* (2022.01)

(58) Field of Classification Search
CPC ........ G06T 11/00; G06N 20/00; G06N 3/045; G06N 3/047; G06N 3/088; G06V 40/168; G06V 10/764; G06V 10/82; G06V 40/172
See application file for complete search history.

(56) References Cited

U.S. PATENT DOCUMENTS

| | | |
|---|---|---|
| 11,250,572 B2 | 2/2022 | Sollami |
| 11,361,362 B2 | 6/2022 | Lundgaard |
| 11,373,343 B2 | 6/2022 | Sollami |
| 11,455,674 B2 | 9/2022 | Lundgaard |
| 11,461,537 B2 | 10/2022 | Lundgaard |
| 2020/0104429 A1 | 4/2020 | Lundgaard |
| 2021/0049664 A1 | 2/2021 | Lundgaard |
| 2021/0110455 A1 | 4/2021 | Lundgaard |
| 2021/0141995 A1 | 5/2021 | Lundgaard |
| 2022/0254150 A1 | 8/2022 | Wolfe |
| 2022/0284641 A1 | 9/2022 | Sollami |
| 2022/0343389 A1 | 10/2022 | Kushkuley |
| 2023/0162407 A1* | 5/2023 | Kalarot ............... G06V 40/172 382/118 |
| 2024/0037805 A1* | 2/2024 | Motiian ............... G06V 40/168 |

\* cited by examiner

*Primary Examiner* — Said Broome
*Assistant Examiner* — Andrew Shin
(74) *Attorney, Agent, or Firm* — Butzel Long (57) ABSTRACT

Systems and methods are provided for detecting, at a face detection model of a server, a face of a person having a first identity in an image. A face recognition model of the server may detect an identity vector for the detected face of the person in the image. A new identity vector may be generated based on at least the detected identity vector. A revised image may be generated using the generated new identity vector and the image to be output for display, where the face of the person having the first identity in the image has a second identity in the revised image based on the generated new identity vector. The server may transmit the revised image.

18 Claims, 12 Drawing Sheets

GMM on normalized data

FIG. 3C

GMM on unnormalized data

FIG. 4

New_latent_id = (1-a)*Old_latent_id+a*GMM_mean

Original    a = 0    a = 0.2    a = 0.4    a = 0.6    a = 0.8    a = 1 a = 0.91   a = 0.92   a = 0.93   a = 0.94   a = 0.95   a = 0.96   a = 0.97   a = 0.98   a = 0.99

Source 1 Image

Source 2 Image

SYSTEMS AND METHODS OF IDENTITY REMOVAL IN IMAGES

BACKGROUND

Present systems of identity change or identity removal of a person in an image rely on two primary techniques. Some present systems allow a face of a person in an image to be blurred so that the identity of the person is hidden. In other systems, an image transformation or change in the identity of the person in the image is performed on a pixel-by-pixel basis to the face of the person that appears in the image.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of the disclosure can be practiced without these specific details, or with other methods, components, materials, or the like. In other instances, well-known structures and devices are shown in block diagram form to facilitate describing the subject disclosure.

The data used for commercial websites, electronic catalogs, and the like, as well as used to train machine learning models, may have sensitive information. This information may include the identity of the people in an image. Typically, the identity of the person should not be released (unless the use of the image has been approved by the person for a specific commercial purpose), nor used in training machine learning models.

Implementations of the disclosed subject matter provide systems and methods of removing the identity of a person in an image that may be used, for example, for commercial purposes and/or to train machine learning models. The resultant image is such that the identity of the person may not be recognizable visually and/or by machine learning models. Implementations of the disclosed subject matter may change the identity of a person in an image into any desired identity. The image with the changed identity may be used, for example, in an e-commerce site.

Presently, any image transformation or change in the identity of an image is done on a pixel-by-pixel basis to a face of a person that appears in an image. This is computationally more intensive (e.g., requires greater computing resources and time) than generating an identity vector and modifying an image using the generated new identity vector as in the present inventive concept.

In implementations of the disclosed subject matter, a face detection model may be used to detect one or more faces in the image. The identity of the one or more detected faces may be changed to preserve their identity. A face recognition model may be used to generate an identity vector for the one or more detected faces in the image. The identity vector may be a vector that encodes the identity of the person in the image. A new identity vector may be generated, where the new identity vector may be used by a face swap model to change the identities of the one or more detected faces in the image.

As discussed in detail below, the new identity vector may be generated in a plurality of ways. In a first example, a new identity vector may be generated using a generative model, where a Variational Auto-Encoder (VAE) model may be trained on the identity vectors of a public dataset (e.g., where the dataset includes one or more images). Using the trained VAE, a new identity vector may be generated. In this first example, the new identity may be generated in the latent space of the face recognition model. This first example may be a stochastic method.

In a second example, the new identity vector may be generated by fitting a Gaussian Mixture Models (GMM) on the identity vectors of the public dataset. After fitting the GMM models on the public dataset, the center of the clusters (i.e., a deterministic method) may be used to generate the new identity vector, or a sample from the resulting Gaussian distributions (i.e., a stochastic method) may be used to generate the new identity vector.

In a third example, the new identity vector may be generated by searching for the closest identity among the identities of the public dataset. That is, the identity of the face in the primary image (i.e., original image) may be encoded, and a K-nearest neighbors (KNN) method may be used to find the closest identity among the identities of the public dataset. The method of the third example may be deterministic, and may be used to find the identities that may have similar age ranges and gender to the one or more faces of the original image.

When the new identity vector is generated, it may be used to modify the identity of the person in the original image. That is, the output image may have a new face that has a different identity. This may change the identity of the person from the original image, while preserving other attributes in the image. The output image with the changed identity may be used, for example, by machine learning models and/or for e-commerce sites.

That is, implementations of the disclosed subject matter generate new identities for one or more faces in an image. For example, a new identity may be generated in the latent space of face recognition models (e.g., generating the new identity vector to change the face in an image), rather than generating a new identity in the pixel space (e.g., manipulating pixels in an image to change the identity of the face). Implementations of the disclosed subject matter may change the identity of one or more faces in an image.

FIGS. 1A-1H show an example method 100 of identity removal in images according to implementations of the disclosed subject matter. At operation 110 shown in FIG. 1A, a face detection model of a server may detect a face of a person having a first identity in an image. The face detection model may be face detection model 720 of server 700 shown in FIG. 6 and described below. For example, the face detection model may be RetinaNet™ or any suitable face detection model to detect one or more faces in an image.

Figure 1A:
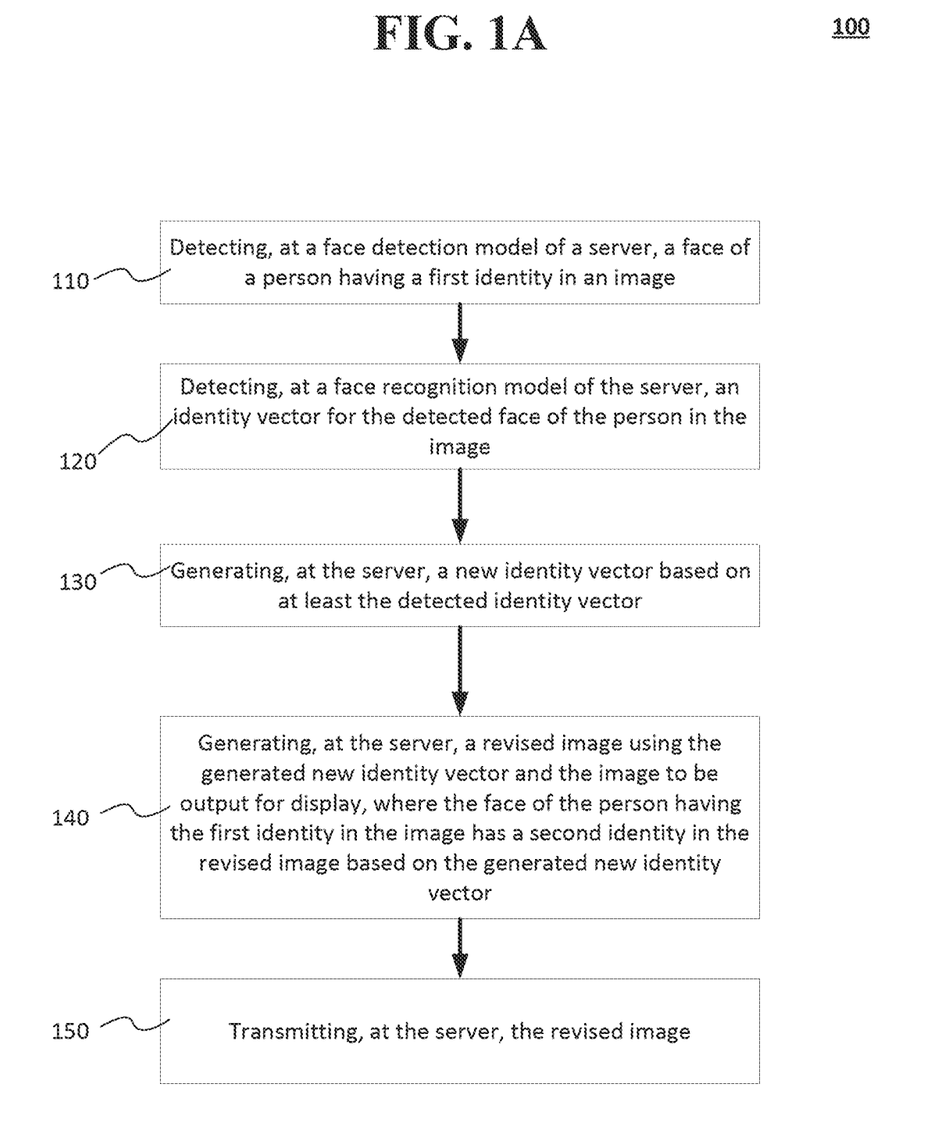
FIGS. 1A-1H show example methods of identity removal in images according to implementations of the disclosed subject matter.

At operation 120, a face recognition model of the server may detect an identity vector for the detected face of the person in the image. That is, the identity vector may encode the identity of the person with the face in the image. The face recognition model may be face recognition model 730 of server 700 shown in FIG. 6 and described below. For example, the face recognition model may be ArcFace™ or any suitable face recognition model to detect an identity vector, which may be a vector that encodes the identity of the person in the image.

Figure 1B:
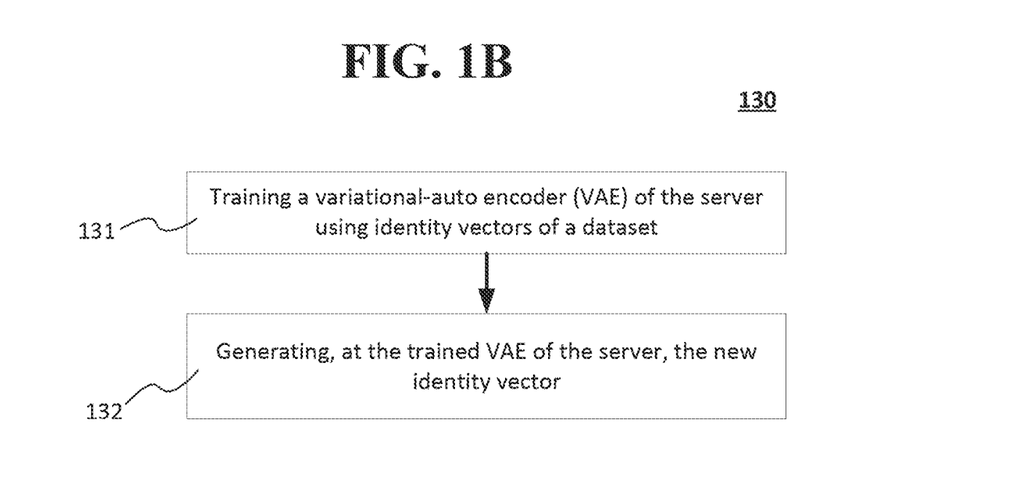

At operation 130, the server may generate a new identity vector based on at least the detected identity vector. The new identity vector may be used by the server to change the identity of the face in the image. FIG. 1B shows a first example method of generating a new identity vector at operation 130. At operation 131, a variational auto-encoder (VAE) of the server may be trained using identity vectors of a dataset. The VAE may be variational auto-encoder (VAE) 740 of server 700 shown in FIG. 6. For example, the dataset may be a publicly available dataset that includes images of one or more persons, and may be stored in storage 710. At operation 132, the trained VAE of the server may generate the new identity vector. That is, in the example method shown in FIG. 1B to generate a new identity vector, the VAE may be trained on the identity vectors of a public dataset. Using the resulting model, a new identity vector may be generated in the latent space of the face recognition model (e.g., face recognition model 730 shown in FIG. 6, ArcFace™, or the like).

Figure 2A:
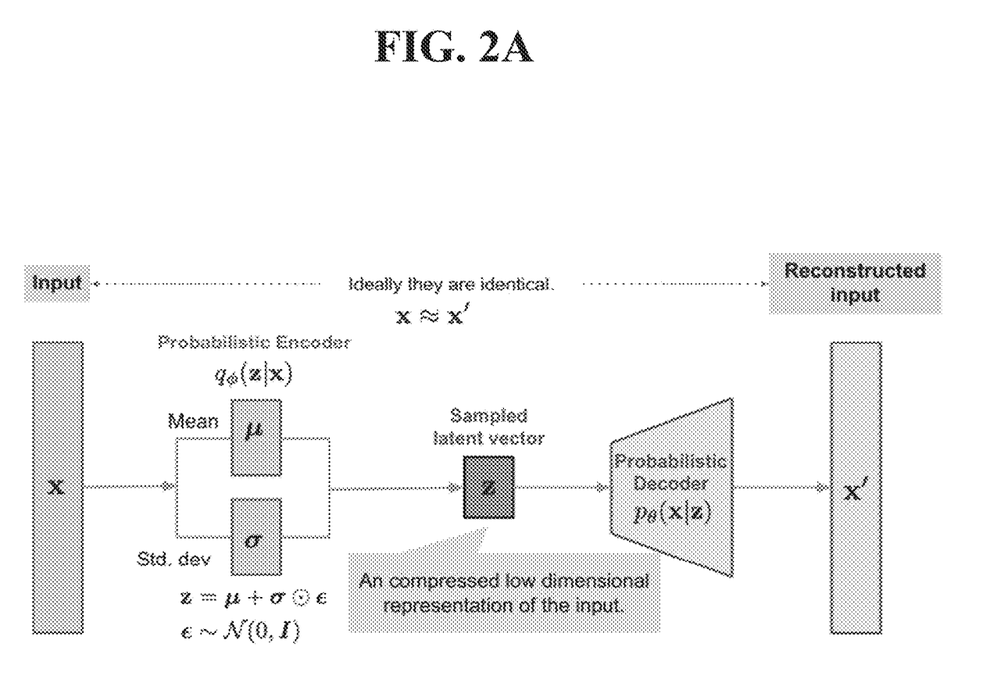
FIG. 2A shows a workflow that uses a Variational Auto-Encoder (VAE) to determine a mean and variance to generate a new identity vector according to an implementation of the disclosed subject matter.

FIG. 2A shows a workflow that uses a Variational Auto-Encoder (VAE) to determine a mean (u) and variance (i.e., standard deviation, σ) to generate a new identity vector according to an implementation of the disclosed subject matter. In the example workflow shown in FIG. 2A, the VAE may include a probabilistic encoder and a probabilistic decoder, which may be deep neural networks having convolution layers and fully-connected layers. The probabilistic encoder may predict the mean and standard deviation of the identity vector based on the input image. As shown in FIG. 2A, the sampling process may generate a new identity vector. The new identity vector may be provided to the probabilistic decoder to reconstruct the original image.

Figure 2B:
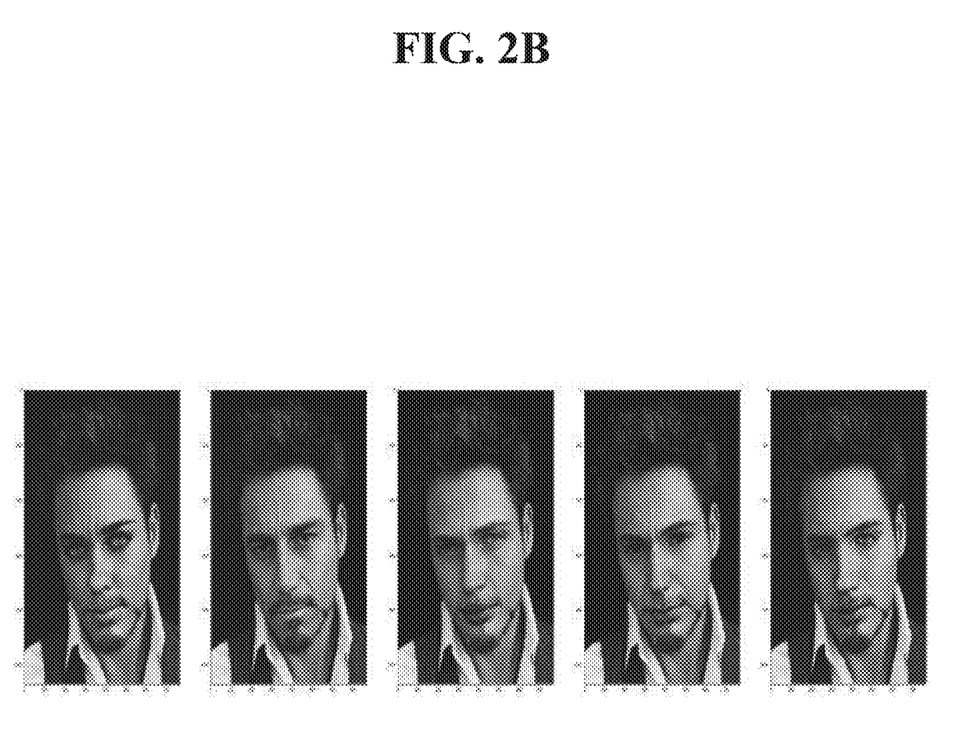
FIG. 2B shows a range of images generated using the new identity vector by using the VAE according to an implementation of the disclosed subject matter.
Figure 6:
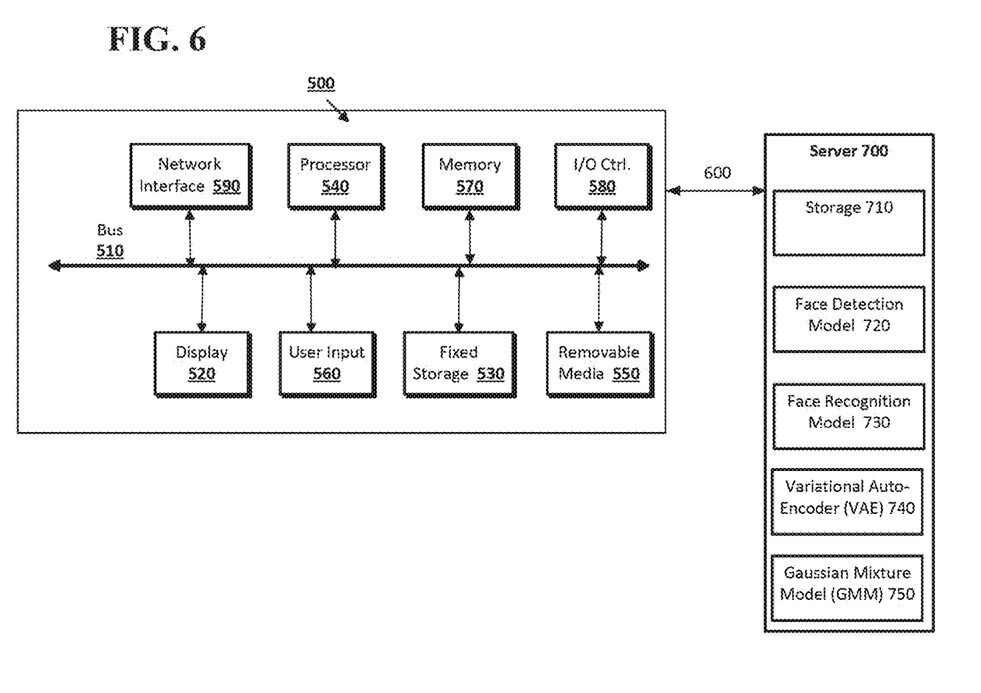
FIG. 6 shows a computer system according to an implementation of the disclosed subject matter.

The workflow of FIG. 2A may be used in operation 131 by the server to train the VAE (e.g., VAE 740 shown in FIG. 6) with identity vectors (e.g., that may be stored in storage 710 shown in FIG. 6). The mean and the standard deviation of the identity vectors may be determined by the server with the workflow shown in FIG. 2A. A new latent vector may be sampled from the distribution of vectors (e.g., a Gaussian distribution of vectors). The sampled new latent vector may become the new identity vector at operation 132, which may be used to revise the image so that the person in the revised image has a new identity. FIG. 2B shows a range of images generated using the new identity vector by using the VAE according to an implementation of the disclosed subject matter. In some implementations, each of the different images shown in FIG. 2B may be generated based on a new latent vector that is sampled from the Gaussian distribution of the trained VAE.

Figure 1C:
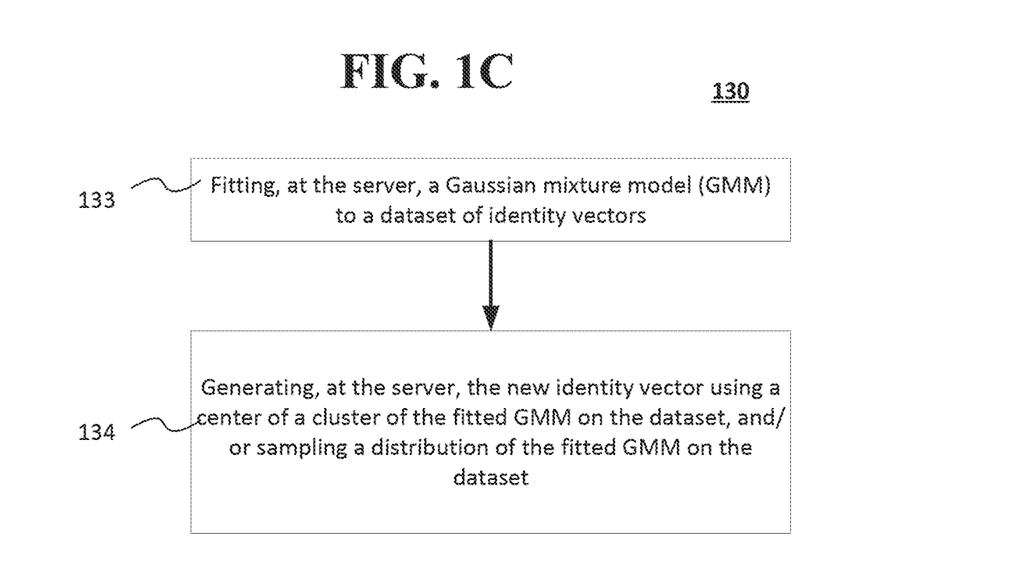
Figure 1D:
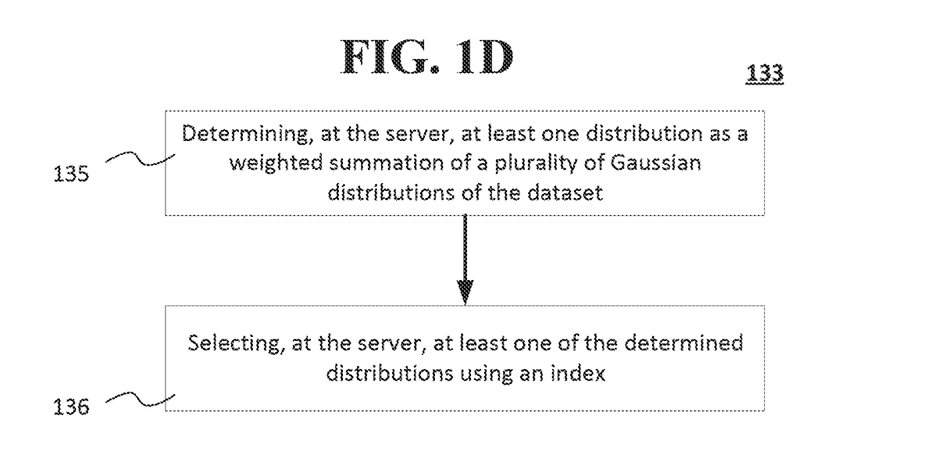

FIG. 1C shows a second example method of generating a new identity vector at operation 130. At operation 133, the server may fit a Gaussian mixture model (GMM) to a dataset (e.g., a public dataset) of identity vectors. An example method of performing operation 133 is shown in FIG. 1D, where the server may determine at least one distribution as a weighted summation of a plurality of Gaussian distributions of the dataset at operation 135. At operation 136, the server may select at least one of the determined distributions using an index. In some implementations, the index may be an Akaike Information Criterion (AIC). In some implementations, one component of 512 dimensions may be used for the AIC index, where the one component may be used for normalized and/or unnormalized data. Returning to the second example method of generating a new identity vector as shown in FIG. 1C, the server may generate the new identity vector using a center of a cluster of the fitted GMM on the dataset, and/or sampling a distribution of the fitted GMM on the dataset at operation 134. That is, in the second example method shown in FIGS. 1C-D, a new identity vector may be generated by fitting the GMM with the identity vectors of the dataset. When the GMM models have been fit on the dataset, the center of the clusters (i.e., a deterministic method) or a sample from the resulting Gaussian distributions (i.e., a stochastic method) may be used to generate the new identity vector.

Figure 3A:
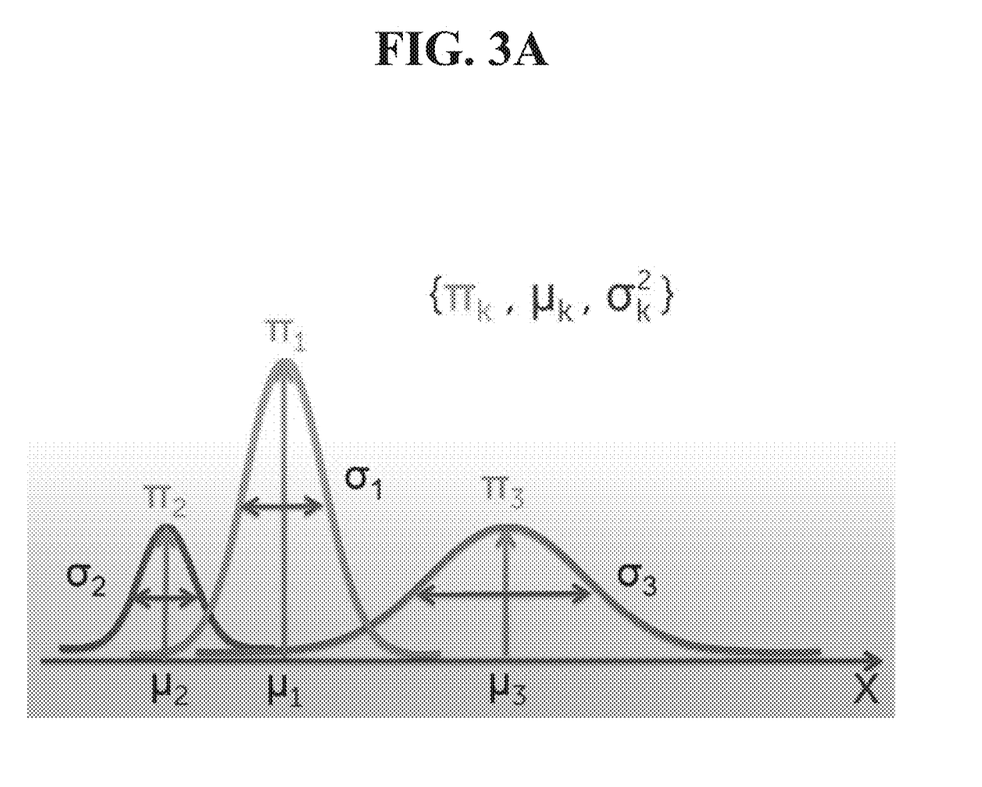
FIG. 3A shows Gaussian distributions generated by the Gaussian Mixture Model (GMM) that may be used to generate a new identity vector according to an implementation of the disclosed subject matter.
Figure 3B:
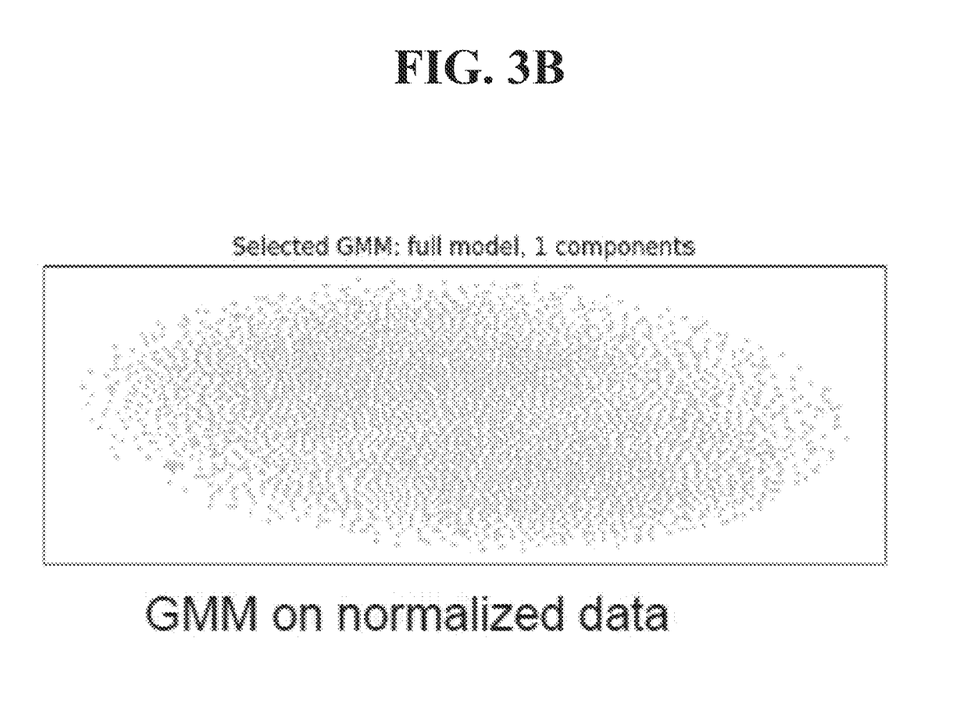
FIG. 3B shows an example distribution when the GMM of FIG. 3A is applied to normalized data according to an implementation of the disclosed subject matter.
Figure 3C:
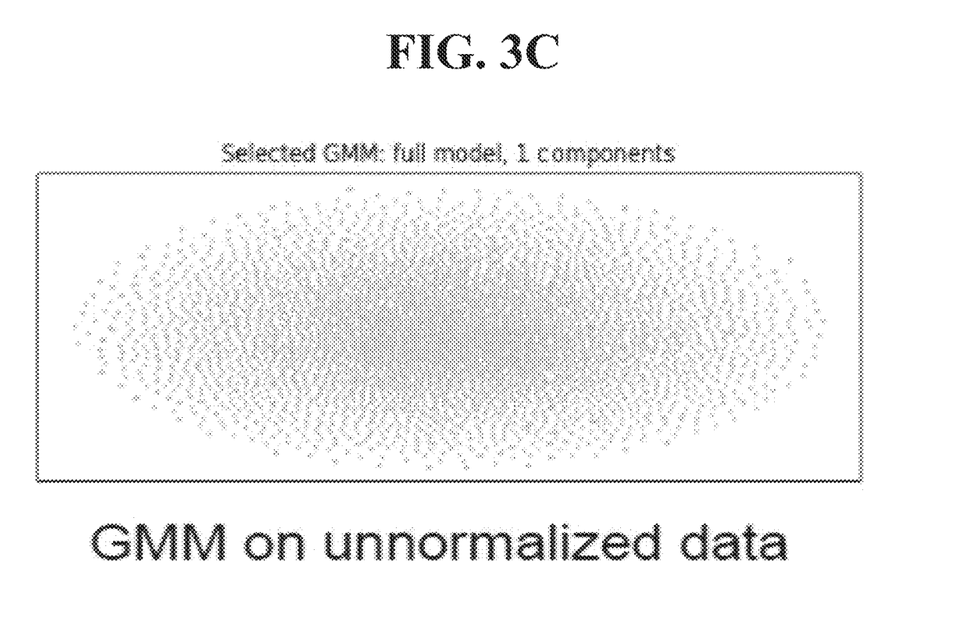
FIG. 3C shows an example distribution when the GMM of FIG. 3A is applied to unnormalized data according to an implementation of the disclosed subject matter.

FIG. 3A shows example one-dimensional (1D) Gaussian distributions generated by the Gaussian Mixture Model (GMM) that may be used to generate a new identity vector according to an implementation of the disclosed subject matter. In some implementations, the GMM may model the distribution as a weighted summation of a plurality of Gaussian distributions. The example distributions shown in FIG. 3A include Gaussian distribution $\pi_1$ (having the mean $\mu_1$ and variance $\sigma_1$), the Gaussian distribution $\pi_2$ (having the mean $\mu_2$ and variance $\sigma_2$), and Gaussian distribution $\pi_3$ (having the mean $\mu_3$ and variance $\sigma_3$). FIG. 3B shows an example distribution when the GMM of FIG. 3A is applied to normalized data, and FIG. 3C shows an example distribution when the GMM of FIG. 3A is applied to unnormalized data. The normalized data shown in FIG. 3B may have a more even distribution when compared to the unnormalized data, where there may be a greater concentration of the data in the center.

Figure 1E:
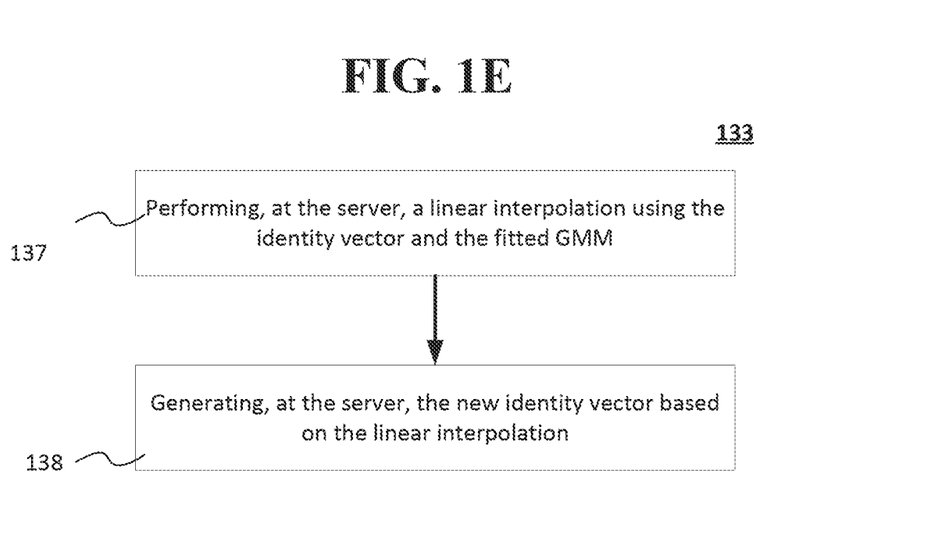
Figure 4:
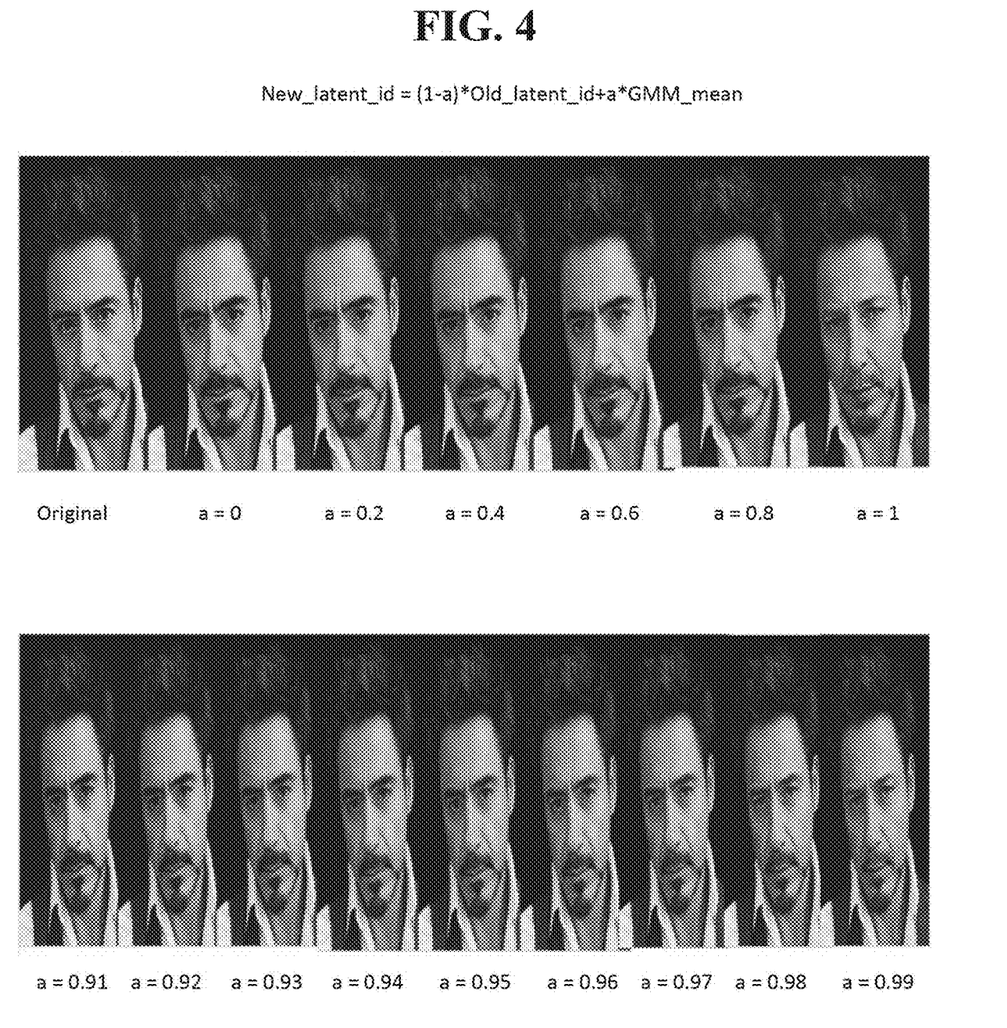
FIG. 4 shows example images generated using linear interpolation of GMM according to an implementation of the disclosed subject matter.

In some implementations, after fitting the GMM to a dataset of identity vectors at operation 133 shown in FIG. 1C, the server may perform a linear interpolation using the identity vector and the fitted GMM at operation 137 shown in FIG. 1E. At operation 138, the server may generate the new identity vector based on the linear interpolation. For example, the new latent identity vector may be generated by the server using the original identity vector (e.g., the identity vector from operation 120, discussed above), a mean of the GMM, and by using a variable a using the following formula: New_latent_id=(1−a)*Old_latent_id+ a*GMM_mean, where New_latent_id is the new latent identity vector, Old_latent_id is the original identity vector, a is a value between 0 and 1, and GMM_mean is a mean value of the GMM. FIG. 4 shows example images generated using linear interpolation of GMM according to an implementation of the disclosed subject matter. For example, FIG. 4 shows the original image, along with changes in the image based on the new latent identity vector, where the value of a is changed in the generation of the new latent identity vector (e.g., a=0, a=0.2, a=0.4, a=0.6, a=0.8, a=1, a=0.91, a=0.92, a=0.93, a=0.94, a=0.95, a=0.96, a=0.97, a=0.98, and a=0.99).

Figure 1F:
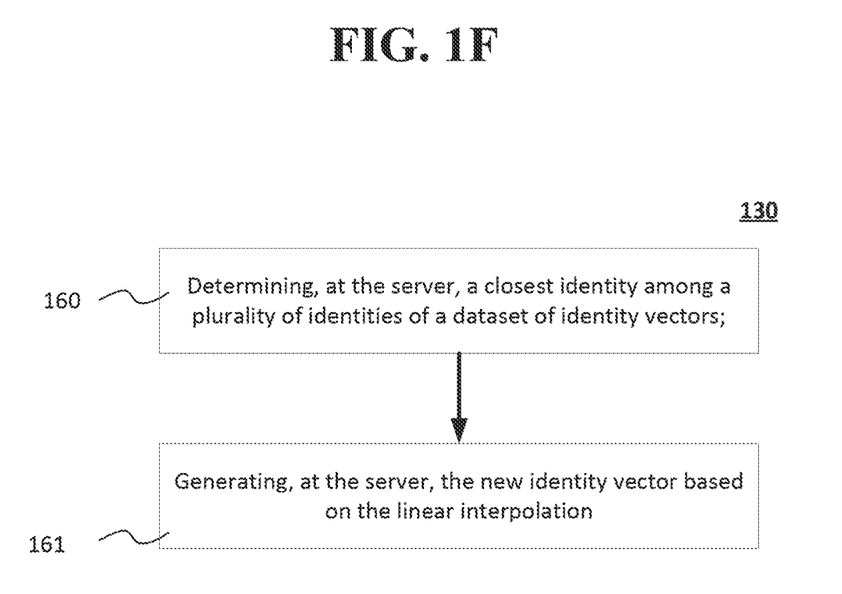
Figure 1G:
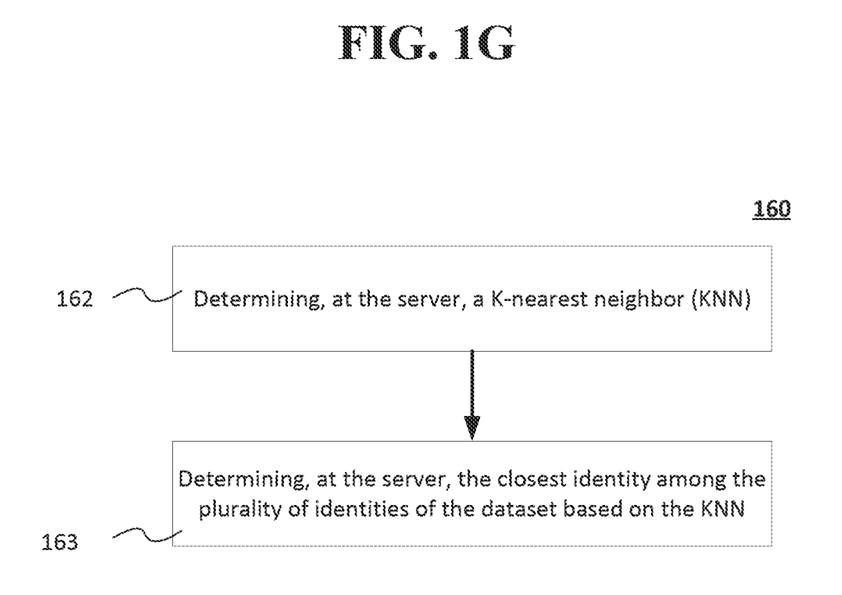

FIG. 1F shows a third method of generating a new identity vector at operation 130. At operation 160, the server may determine a closest identity among a plurality of identities of a public dataset of identity vectors. An example method of performing operation 160 is shown in FIG. 1G. At operation 162 of FIG. 1G, the server may determine a K-nearest neighbor (KNN). That is, the server may determine the nearest neighbor to the identity vector determined at operation 120 amongst the dataset of identity vectors. At operation 163, the server may determine the closest identity among the plurality of identities of the public dataset based on the KNN. Returning to the third method of generating a new identity vector shown in FIG. 1F, the server may generate the new identity vector based on the determined closest identity.

Figure 1H:
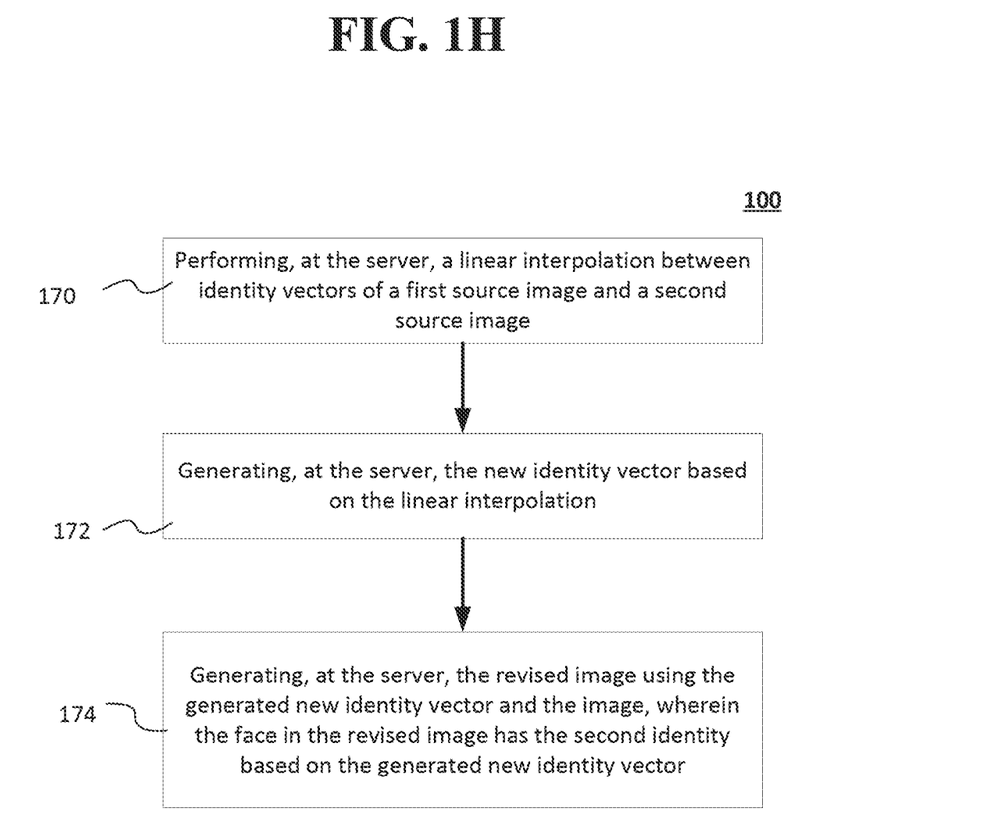
Figure 5A:
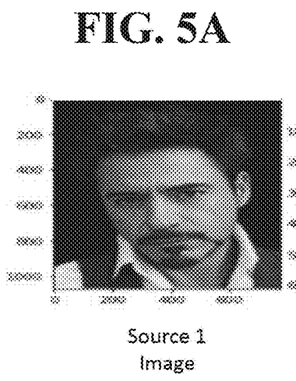
FIGS. 5A-5C show example images generated by extracting features from a source 1 image and a source 2 image according to an implementation of the disclosed subject matter.
Figure 5B:
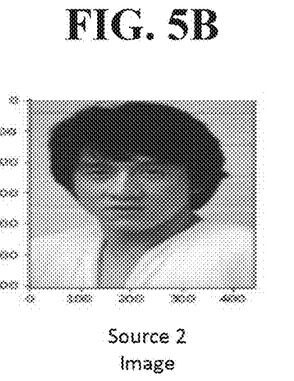
Figure 5C:
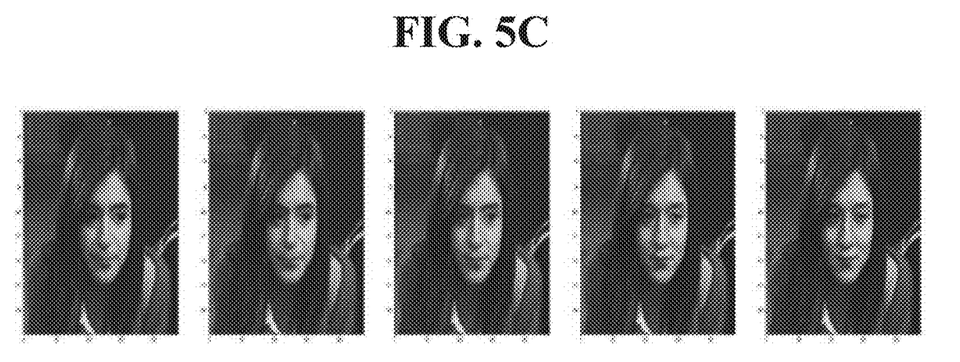

In some implementations, such as shown in FIG. 1H, the server (e.g., server 700 shown in FIG. 6) may perform a linear interpolation between identity vectors of the image and a second image at operation 170. For example, the image (i.e., first image) may be the source 1 image shown in FIG. 5A, and the second image may be the source 2 image shown in FIG. 5B. The server 700 may perform a linear interpolation between identity vectors of the source 1 image and the source 2 image at operation 170. At operation 172, the server may generate the new identity vector based on the linear interpolation between the source 1 image and the source 2 image. The new identity vector may be used to generate a revised image from the original image. At operation 174, the server may generate the revised image using the generated new identity vector and the original image, where the face in the revised image has a second identity based on the generated new identity vector. FIG. 5C shows variations of an identity of a person in the original image, where the identity of the person has been changed based on different new identity vectors that are based on the interpolation between the source 1 image of FIG. 5A and the source 2 image of FIG. 5B.

When the new identity vector is generated at operation 130 using one of the examples described above, a revised image may be generated at the server using the generated new identity vector and the image to be output for display at operation 140, where the face of the person having the first identity in the image has a second identity in the revised image based on the generated new identity vector. At operation 150, the server may transmit the revised image. For example, the server may transmit the revised image to be output by a display, such as display 520 of computer 500 shown in FIG. 6.

Implementations of the presently disclosed subject matter may be implemented in and used with a variety of component and network architectures. FIG. 6 is an example computer 500 suitable for the implementations of the presently disclosed subject matter. As discussed in further detail herein, the computer 500 may be a single computer in a network of multiple computers. In some implementations, the computer 500 may be used to generate a workflow definition and/or display a current state (e.g., a not-started state, an in-progress state, and/or completed state, or the like). As shown in FIG. 6, the computer 500 may communicate with a server 700 (e.g., a server, cloud server, database, cluster, application server, neural network system, or the like) via a wired and/or wireless communications network 600. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 may store data, such as one or more images, identity vectors for a detected face of a person, a public dataset that includes one or more images of persons, datasets of identity vectors, one or more new identity vectors that are generated, revised images that are generated using the new identity vectors, and the like.

Face detection model 720 may be part of server 700, and may be software and/or hardware. In some implementations, the face detection model 720 may be RetinaNet™ or any suitable face detection model to detect one or more faces in an image.

Face recognition model 730 may be part of server 700, and may be software and/or hardware. In some implementations, the face recognition model 730 may be ArcFace™ or any suitable face recognition model to generate an identity vector, which may be a vector that encode the identity of person in the image.

Variation-Auto Encoder (VAE) 740 may be part of server 700, and may be software and/or hardware. In some implementations, the VAE 740 may be trained on a dataset of images stored in storage 710, and may be used to generate new identity vectors.

Gaussian Mixture Model (GMM) 750 may be part of server 700, and may be software and/or hardware. In some implementations the GMM 750 may be probabilistic model that assumes all the data points are generated from a mixture of a finite number of Gaussian distributions with unknown parameters. The GMM 750 may be fit to a dataset of identity vectors to generate a new identity vector to be used to change the identity of a person in an image, as discussed above.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "detecting," "generating," "transmitting," "training," "fitting," determining," "selecting," "performing" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:
1. A method comprising:
  detecting, at a face detection model of a server, a face of a person having a first identity in an image;

detecting, at a face recognition model of the server, an identity vector for the detected face of the person in the image;

generating, at the server, a new identity vector based on at least the detected identity vector, further comprising:
fitting, at the server, a Gaussian mixture model (GMM) to the dataset of identity vectors, and
generating, at the server, the second new identity vector by at least one selected from the group consisting of: using a center of a cluster of the fitted GMM on the dataset of identity vectors, and sampling a distribution of the fitted GMM on the dataset of identity vectors;

generating, at the server, a revised image using the generated new identity vector and the image to be output for display, wherein the face of the person having the first identity in the image has a second identity in the revised image based on the generated new identity vector; and transmitting, at the server, the revised image.

2. The method of claim 1, wherein the identity vector encodes the identity of the person with the face in the image.

3. The method of claim 1, further comprising generating a second new identity vector by:
training a variational auto-encoder (VAE) of the server using the dataset of identity vectors; and
generating, at the trained VAE of the server, the second new identity vector.

4. The method of claim 1, wherein the fitting the GMM comprises:
determining, at the server, at least one distribution as a weighted summation of a plurality of Gaussian distributions of the dataset of identity vectors; and
selecting, at the server, at least one of the determined distributions using an index.

5. The method of claim 4, wherein the index is an Akaike Information Criterion (AIC).

6. The method of claim 1, further comprising:
performing, at the server, a linear interpolation using the identity vector and the fitted GMM; and
generating, at the server, the second new identity vector based on the linear interpolation.

7. The method of claim 1, further comprising:
performing, at the server, a linear interpolation between identity vectors of a first source image and a second source image;
generating, at the server, the new identity vector based on the linear interpolation; and
generating, at the server, the revised image using the generated new identity vector and the image, wherein the face in the revised image has the second identity based on the generated new identity vector.

8. The method of claim 1, wherein the determining the closest identity comprises:
determining, at the server, a K-nearest neighbor (KNN); and
determining, at the server, the closest identity among the plurality of identities of the dataset of identity vectors based on the KNN.

9. The method of claim 1, wherein the generating the new identity vector further comprises:
determining, at the server, a closest identity among a plurality of identities of a dataset of identity vectors; and generating, at the server, the new identity vector based on the determined closest identity.

10. A system comprising:
a server having a processor and a memory that is configured to:
detect, at a face detection model of the server, a face of a person having a first identity in an image;
detect, at a face recognition model of the server, an identity vector for the detected face of the person in the image;
generate a new identity vector based on at least the detected identity vector by fitting, at the server, a Gaussian mixture model (GMM) to the dataset of identity vectors, and
generating, at the server, the second new identity vector by at least one selected from the group consisting of: using a center of a cluster of the fitted GMM on the dataset of identity vectors, and sampling a distribution of the fitted GMM on the dataset of identity vectors;
generate a revised image using the generated new identity vector and the image to be output for display, wherein the face of the person having the first identity in the image has a second identity in the revised image based on the generated new identity vector; and
transmit the revised image.

11. The system of claim 10, wherein the identity vector encodes the identity of the person with the face in the image.

12. The system of claim 10, wherein the server generates a second new identity vector by training a variational auto-encoder (VAE) of the server using the dataset identity vectors, and generating, at the trained VAE of the server, the second new identity vector.

13. The system of claim 10, wherein the server fits the GMM by determining at least one distribution as a weighted summation of a plurality of Gaussian distributions of the dataset of identity vectors, and selects at least one of the determined distributions using an index.

14. The system of claim 13, wherein the index is an Akaike Information Criterion (AIC).

15. The system of claim 10, wherein the server performs a linear interpolation using the identity vector and the fitted GMM, and generates the second new identity vector based on the linear interpolation.

16. The system of claim 10, wherein the server performs a linear interpolation between identity vectors of a first source image and a second source image, generates the new identity vector based on the linear interpolation, and generates the revised image using the generated new identity vector and the image, wherein the face in the revised image has the second identity based on the generated new identity vector.

17. The system of claim 10, wherein the server determines the closest identity by determining a K-nearest neighbor (KNN), and determining the closest identity among the plurality of identities of the dataset of identity vectors based on the KNN.

18. The server of claim 10, wherein the server generates the new identity vector by determining a closest identity among a plurality of identities of a dataset of identity vectors, and generating the new identity vector based on the determined closest identity.

* * * * *